(12) United States Patent
Johnson, Jr.

(10) Patent No.: US 9,897,076 B1
(45) Date of Patent: Feb. 20, 2018

(54) SOLAR POWER TOWER WITH SPRAY NOZZLE AND ROTATING RECEIVER

(71) Applicant: Raymond Johnson, Jr., Willingboro, NJ (US)

(72) Inventor: Raymond Johnson, Jr., Willingboro, NJ (US)

(*) Notice: Subject to any disclaimer, the term of this patent is extended or adjusted under 35 U.S.C. 154(b) by 784 days.

(21) Appl. No.: 13/907,052

(22) Filed: May 31, 2013

(51) Int. Cl.
| | |
|---|---|
| *F03G 6/06* | (2006.01) |
| *F24J 2/07* | (2006.01) |
| *F24J 2/54* | (2006.01) |
| *F24J 2/46* | (2006.01) |
| *F03G 6/00* | (2006.01) |
| *F24J 2/04* | (2006.01) |

(52) U.S. Cl.
CPC .............. *F03G 6/06* (2013.01); *F03G 6/065* (2013.01); *F24J 2/04* (2013.01); *F24J 2/07* (2013.01); *F24J 2/4621* (2013.01); *F24J 2/4623* (2013.01); *F24J 2/54* (2013.01); *F24J 2/5406* (2013.01); *F03G 2006/008* (2013.01); *F24J 2002/0405* (2013.01); *F24J 2002/075* (2013.01); *Y02E 10/41* (2013.01); *Y02E 10/47* (2013.01)

(58) Field of Classification Search
CPC .. F24J 2002/075; F24J 2/07; F24J 2/54; F24J 2/5403; F24J 2/5406; F24J 2/04; F24J 2/02; F24J 2/38; F24J 2/402; F03G 2006/008; F03G 6/00; F03G 6/06; B60K 2016/003
USPC .............. 126/571, 572, 576, 599, 600, 605; 60/641.11, 641.15
See application file for complete search history.

(56) References Cited

U.S. PATENT DOCUMENTS

| | | | |
|---|---|---|---|
| 4,002,032 A * | 1/1977 | Bash ..................... | F02C 1/05 126/579 |
| 4,136,674 A | 1/1979 | Korr | |
| 4,144,716 A * | 3/1979 | Chromie .................. | 60/641.15 |
| 4,365,618 A * | 12/1982 | Jones ...................... | 126/576 |
| 4,380,229 A | 4/1983 | Glasgow | |
| 4,387,574 A | 6/1983 | Becker et al. | |
| 4,832,002 A | 5/1989 | Medina | |
| 5,861,947 A | 1/1999 | Neumann | |
| 6,957,536 B2 | 10/2005 | Litwin et al. | |
| 7,296,410 B2 | 11/2007 | Litwin | |
| 7,380,549 B1 * | 6/2008 | Ratliff ..................... | 126/605 |
| 7,752,845 B2 | 7/2010 | Johnson | |
| 8,365,529 B2 | 2/2013 | Litwin et al. | |
| 2008/0078378 A1 | 4/2008 | Zhu | |
| 2009/0065054 A1 | 3/2009 | Gonzalez | |
| 2012/0192857 A1* | 8/2012 | Carlson et al. ........... | 126/573 |
| 2012/0247102 A1* | 10/2012 | Taniyama et al. ....... | 60/641.8 |
| 2012/0325314 A1* | 12/2012 | Cheung et al. .......... | 136/259 |

(Continued)

*Primary Examiner* — Mark Laurenzi
*Assistant Examiner* — Xiaoting Hu
(74) *Attorney, Agent, or Firm* — Norman E. Lehrer

(57) ABSTRACT

A solar power plant for generating steam is comprised of a spherical shell, the interior of which is sealed from the outside atmosphere and which is mounted adjacent the top of a vertical tower. A plurality of heliostats surrounds the tower and the direct sunrays onto the sphere for heating the same sphere. A spray nozzle within the sphere directs water supplied to it from an external source onto the interior surface of the sphere to create steam. The steam is withdrawn and directed to a turbine or the like for generating electricity. A motor rotates the sphere about its vertical axis thereby regularly exposing a different portion of the sphere to the heliostats to prevent the sphere from melting.

5 Claims, 5 Drawing Sheets

(56) References Cited

U.S. PATENT DOCUMENTS

| | | | |
|---|---|---|---|
| 2013/0047610 A1* | 2/2013 | Penton | 60/641.11 |
| 2013/0133324 A1* | 5/2013 | Reynolds | 60/641.15 |
| 2013/0146124 A1* | 6/2013 | McClure et al. | 136/248 |
| 2014/0116419 A1* | 5/2014 | Hernandez et al. | 126/601 |

* cited by examiner

US 9,897,076 B1

SOLAR POWER TOWER WITH SPRAY NOZZLE AND ROTATING RECEIVER

FIELD OF THE INVENTION

The present invention relates generally to electrical power generation systems, and more particularly to systems and methods that generate electrical power from solar energy.

BACKGROUND OF THE INVENTION

With the rapid expansion of the world's population, coupled with the technological developments in large areas of the world, a dramatic increase in the demand for energy in all forms, including fuels and electricity for heating, lighting, transportation and manufacturing processes has been created. The construction of hydroelectric facilities and the development of fossil fuel resources have continued as it has for many years.

It has become increasingly evident, however, that for a number of reasons these efforts are inadequate to keep pace with the demands of the growing population. Furthermore, fossil fuel resources are known to be limited and the use of fossil fuels are also known to have a negative impact on the environment. It is well known, for example, that the burning of fossil creates numerous harmful greenhouse gasses such as carbon dioxide and methane and the like which contribute to global warming. Even further, environmental concerns are seriously impeding the development of new sources of fossil fuels.

Attention has thus tended to focus on other sources of energy such as nuclear and solar. It is well known, however, that nuclear energy carries serious risks of radiation leaks or explosion thereby limiting its use. The more logical source of energy, therefore, is solar. Solar energy is safe, nonpolluting and has the further advantage that it is not depleted with use.

One promising approach for the collection and conversion of solar energy utilizes a field of reflectors known as heliostats focused on a central collector or receiver that is typically mounted at the top of a tower. The collector may contain liquid salt or some other material that is heated by the sun's rays that are focused on the collector by the heliostats. The heated salt is then passed through a heat exchanger for generating steam that can be used to power a turbine for generating electricity. Alternatively, steam can be generated directly in the collector which functions essentially as a boiler like device. Solar steam generators of these types can be seen, for example, in U.S. Pat. Nos. 8,365,529 and 6,957,536 that issued to Litwin et al. in 2013 and 2005, respectively.

Because the earth moves relative to the sun during the day and from day to day throughout the seasons, the heliostats are normally mounted on pedestals using a gimbal mechanism which enables them to be tilted and turned to follow the sun from early morning to late afternoon each day. All of the heliostats in the reflector field are moved in a manner taught, for example, in U.S. Pat. No. 4,832,002 that issued to Medina in 1989.

In a typical solar energy system discussed above wherein the solar receiver is utilized in conjunction with a plurality heliostats, a loss of coolant to the solar receiver due to a coolant pump failure (or due to some other failure) requires that the reflectors be automatically and rapidly defocused to prevent receiver melt down. However, a pump failure is frequently associated with an overall power failure which would also prevent automatic defocusing of the reflectors. In that type of power failure, receiver melt down would occur.

U.S. Pat. No. 4,380,229 that issued to Glasgow in 1983 attempts to solve this problem by providing a protection means wherein an automatic flow of sufficient coolant will occur to prevent receiver melt down until the reflectors become defocused with respect to the solar receiver due to the earth's rotation. This has the effect of shutting down the steam generation used to operate the turbine, subsequently, halting the generation of electricity. Furthermore, it may take substantial time to get the system up and running again.

Because the prior art has not proven to be totally satisfactory, a need exists for a solar power generator which does not rely on the use of a coolant to prevent melt down and which can continuously operate without fear of the receiver overheating or melting down.

SUMMARY OF THE INVENTION

The present invention is designed to overcome the deficiencies of the prior art discussed above. Accordingly, it is an object of the invention to provide a solar power tower that generates steam and that is more efficient than previously known systems.

It is a further object of the present invention to provide a solar power tower that avoids the problem of melt downs inherent in other systems.

In accordance with the illustrative embodiments demonstrating features and advantages of the present invention, there is provided a solar power plant for generating steam comprised of a spherical shell, the interior of which is sealed from the outside atmosphere and which is mounted adjacent the top of a vertical tower. A plurality of heliostats surrounds the tower and the direct sunrays onto the sphere for heating the same sphere. A spray nozzle within the sphere directs water supplied to it from an external source onto the interior surface of the sphere to create steam. The steam is withdrawn and directed to a turbine or the like for generating electricity. A motor rotates the sphere about its vertical axis thereby regularly exposing a different portion of the sphere to the heliostats to prevent the sphere from melting.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawing one form which is presently preferred; it being understood that the invention is not intended to be limited to the precise arrangements and instrumentalities shown.

DETAILED DESCRIPTION OF THE PREFERRED EMBODIMENT

Figure 1:
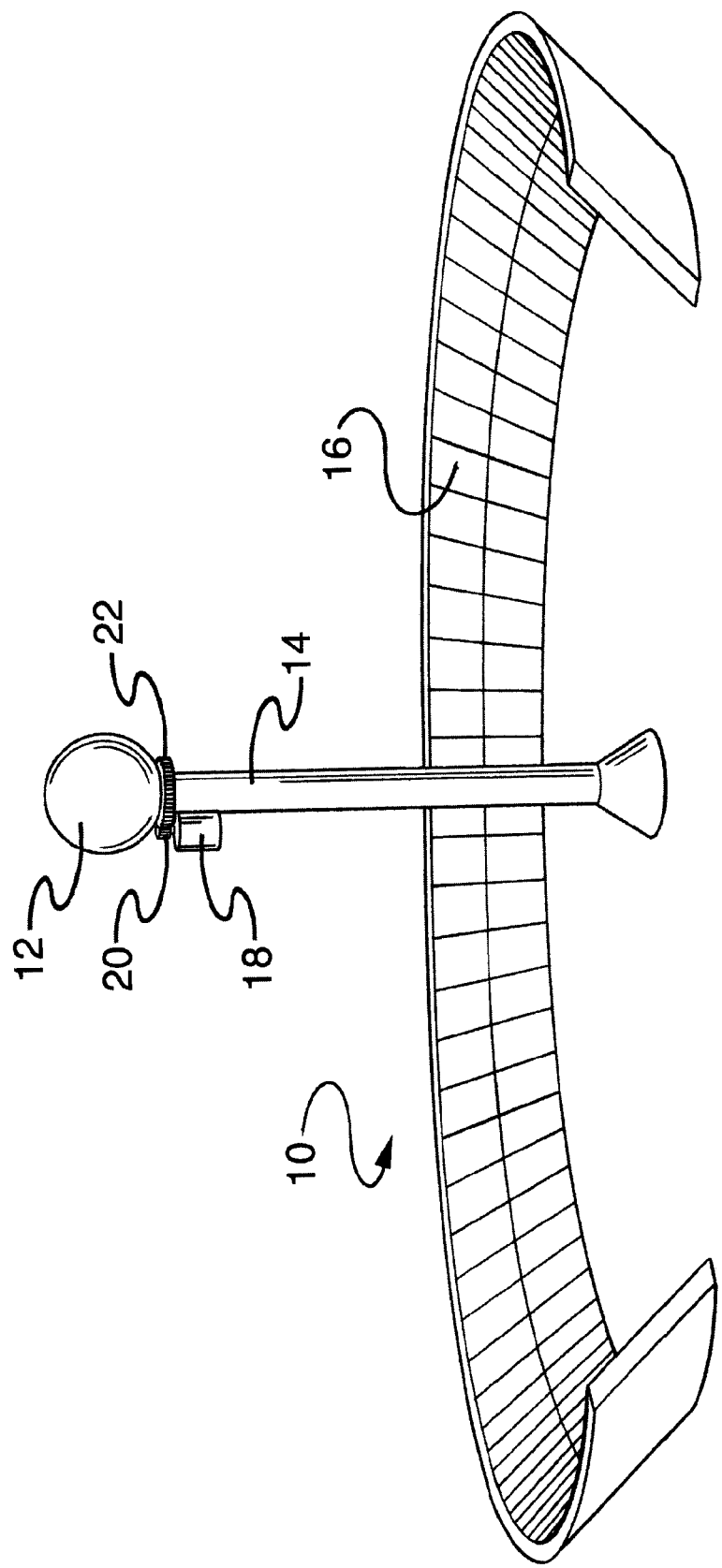
FIG. 1 is a front perspective view of a solar power tower steam generating system of the present invention shown somewhat schematically.
Figure 2:
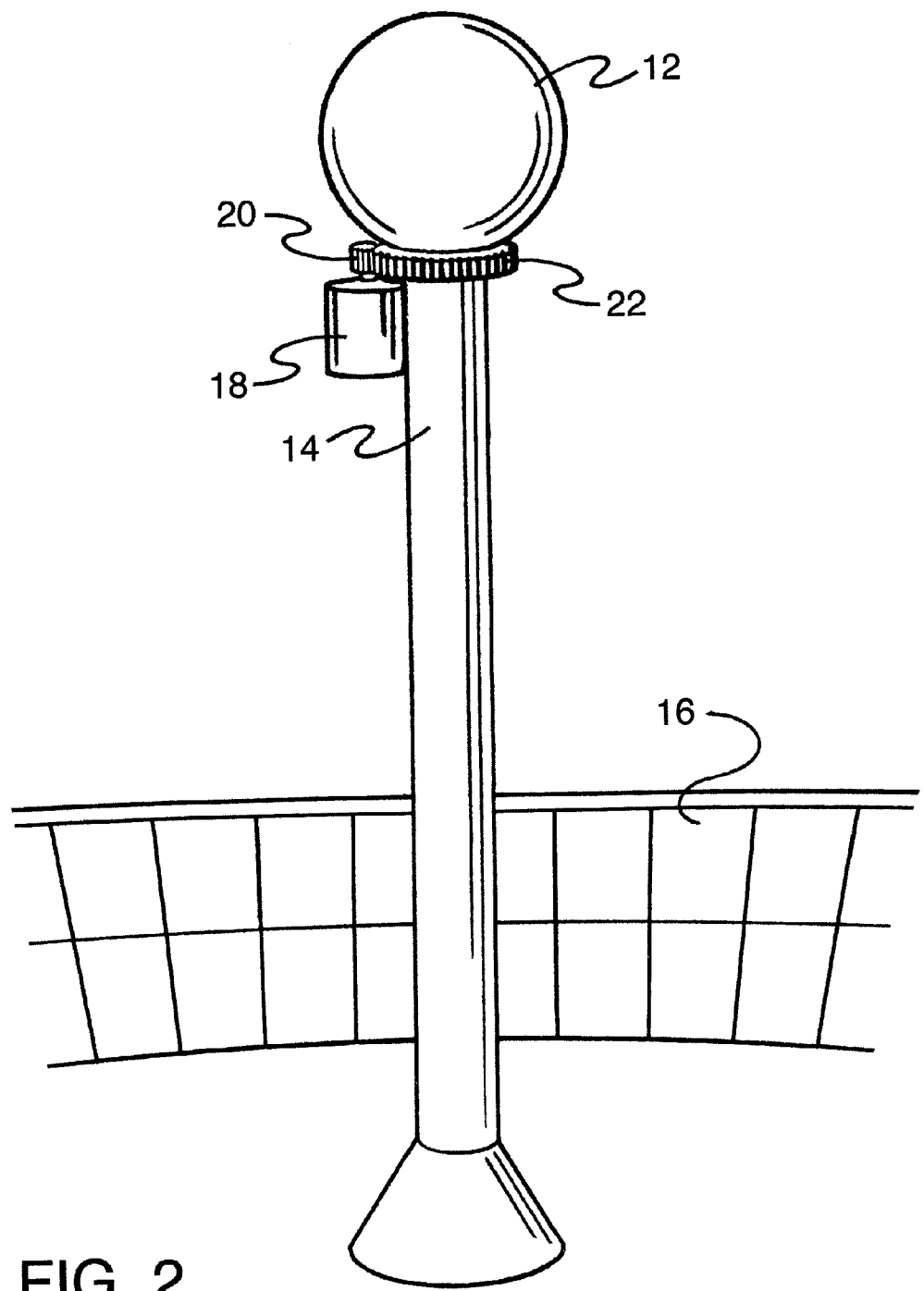
FIG. 2 is a close-up view similar to FIG. 1.

Referring now to the several drawings in detail wherein like reference numerals have been used throughout the various figures to designate like elements, there is shown in FIGS. 1 and 2 a solar power tower steam generating system constructed in accordance with the principles of the present invention and designated generally as 10. The solar power tower steam generating steam or solar power plant 10 is comprised essentially of a receiver 12 mounted for rotation adjacent the top of a tower 14. A plurality of heliostats or reflectors, schematically shown at 16 and supported on the ground, surround the tower 14 and the receiver 12 and direct rays from the sun onto the receiver for heating the same. The heliostats 16 shown schematically in FIGS. 1 and 2 are commonly referred to as a stadium array. Examples of such stadium array arrangements can be found in U.S. Pat. No. 4,136,674 to Korr and U.S. Published Patent Application No. 2009/0065054 to Gonzalez. This is, however, by way of example only.

As should be readily apparent to those skilled in the art, other types of reflectors or heliostats could also be utilized. Furthermore, depending on the geographic location of the installation, it may not be necessary to totally surround the tower 14 and receiver 12 with the heliostats. A semi-circular array or even less may be possible. Thus, the use of the term "surrounding" in this application refers to the geometric area around the tower 14 and receiver 12 that is necessary to properly reflect the sunrays onto the receiver 12.

The tower 14 defines a vertical axis upon which the receiver 12 is mounted for rotation. A motor 18 mounted on the tower 14 is utilized to rotate the receiver 12 about the vertical axis. This can be accomplished through the use of a drive gear 20 that drives a large circular gear or the like 22 attached to the lower end of the receiver 12. Appropriate bearings and gaskets between the receiver and tower, of course, can be provided which will allow the receiver 12 to rotate relative to the tower 14 while maintaining an appropriate seal.

Alternatively, it may also be possible to rotate all or part of the tower 14 in addition to the receiver. That is, the receiver 12 can be securely fastened to the upper end of the tower 14 and the entire tower itself or only an upper portion of the tower can be mounted for rotation.

The rate of rotation of the receiver 12 (or the receiver and part of the tower) will vary depending on the geographic location, time of year and time of day and other factors. It is expected that the receiver will rotate about its axis at lease once per hour and preferably three to four times per hour.

Preferably, the tower 14 is between 50 and 200 feet high. This is, however, by way of example only. Again, based on the size of the receiver being employed, the geographic location and other environmental issues, the height can be changed as desired.

In the preferred embodiment, the receiver 12 is spherically shaped. This is also by way of example only. It is not beyond the scope of the present invention to make the receiver of a different shape such as cylindrical, conical or the like. It is required, however, that the receiver be formed of a substantially hollow metal shell and wherein the interior is sealed from the outside atmosphere. It is also preferable that the cross-sectional area of the receiver, upon which the sunrays from the heliostats impinge, be circular.

Figure 3:
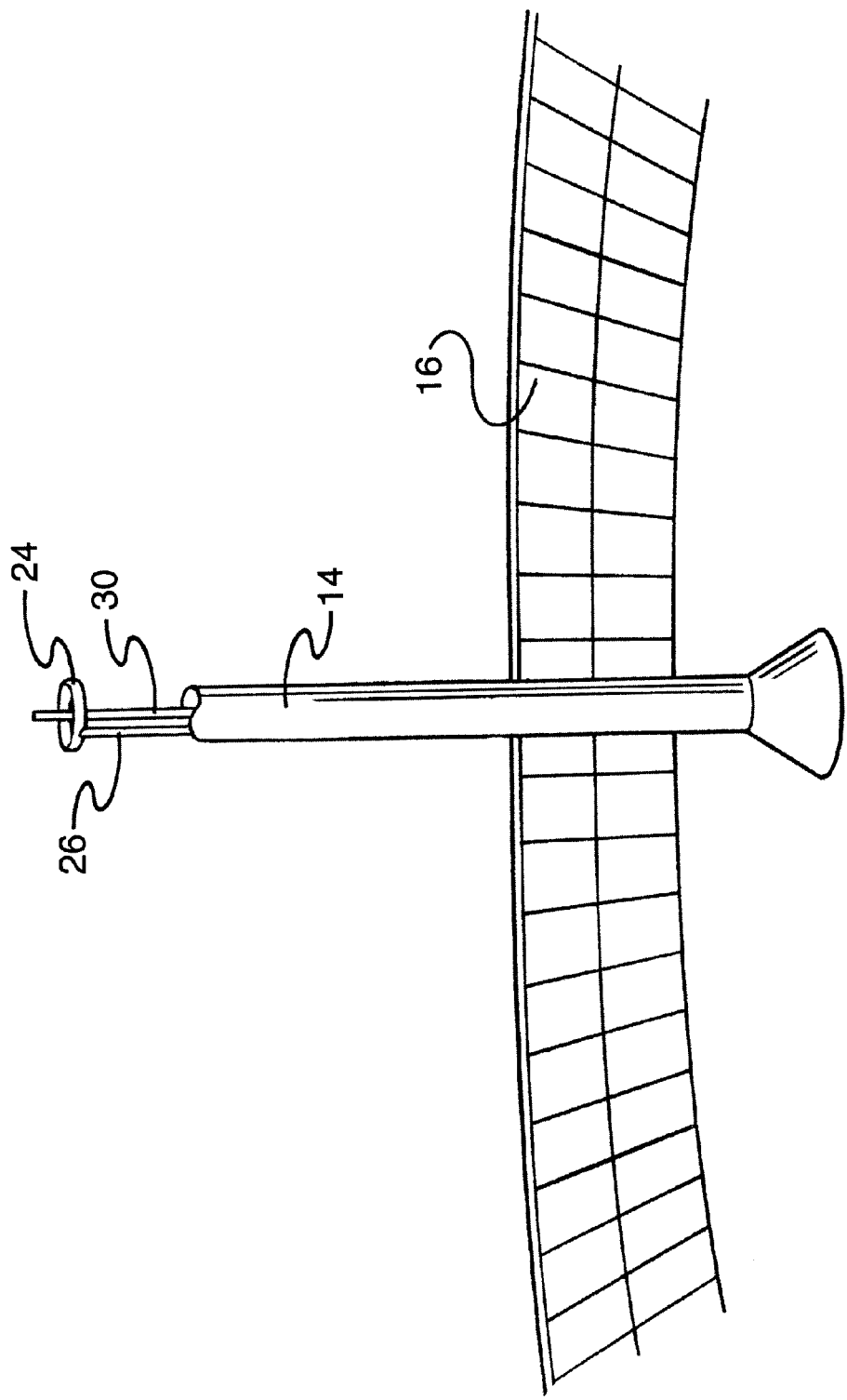
FIG. 3 is a front perspective view similar to FIG. 1 but with the steel spherical shell and a part of the tower removed to reveal the interior thereof.
Figure 4:
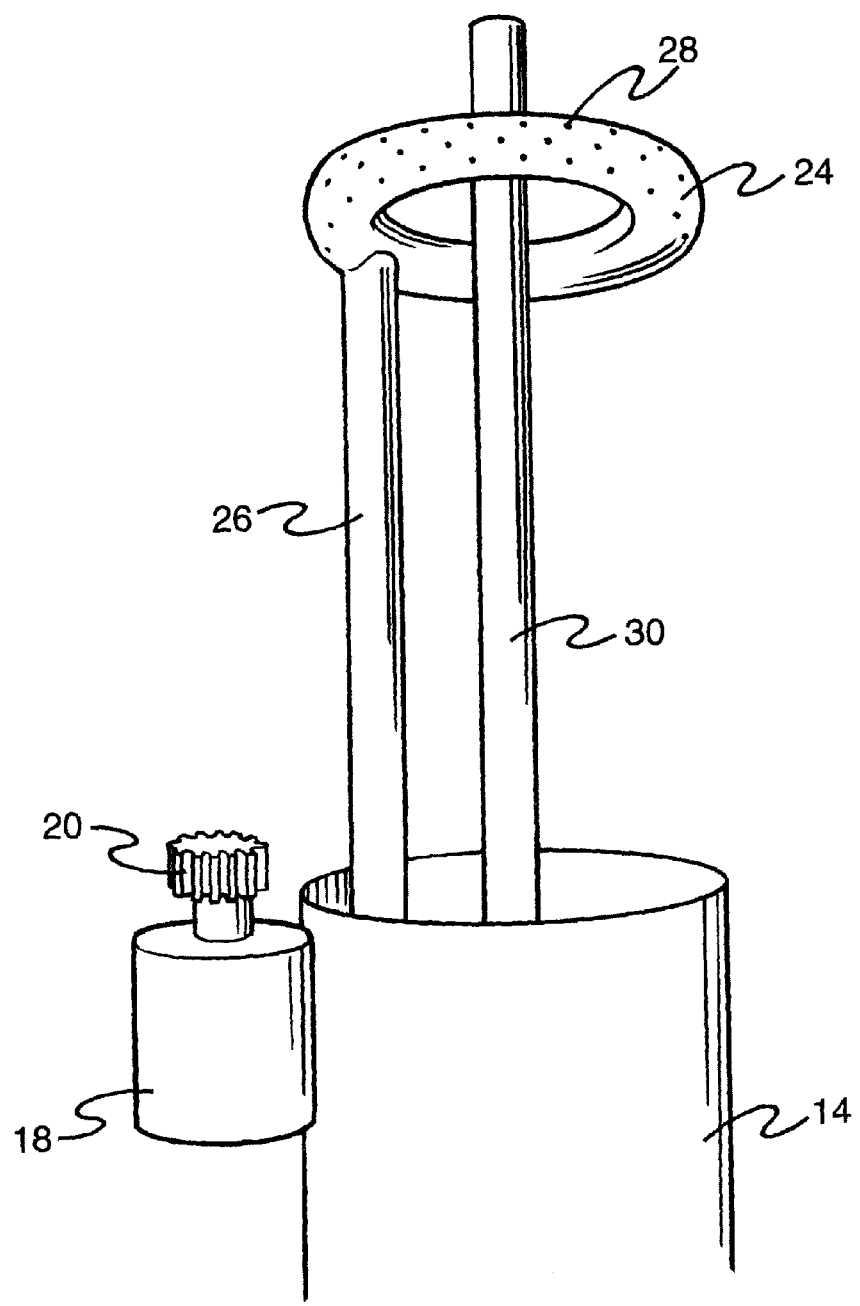
FIG. 4 is a close-up view of the upper portion of the apparatus shown in FIG. 3.
Figure 5:
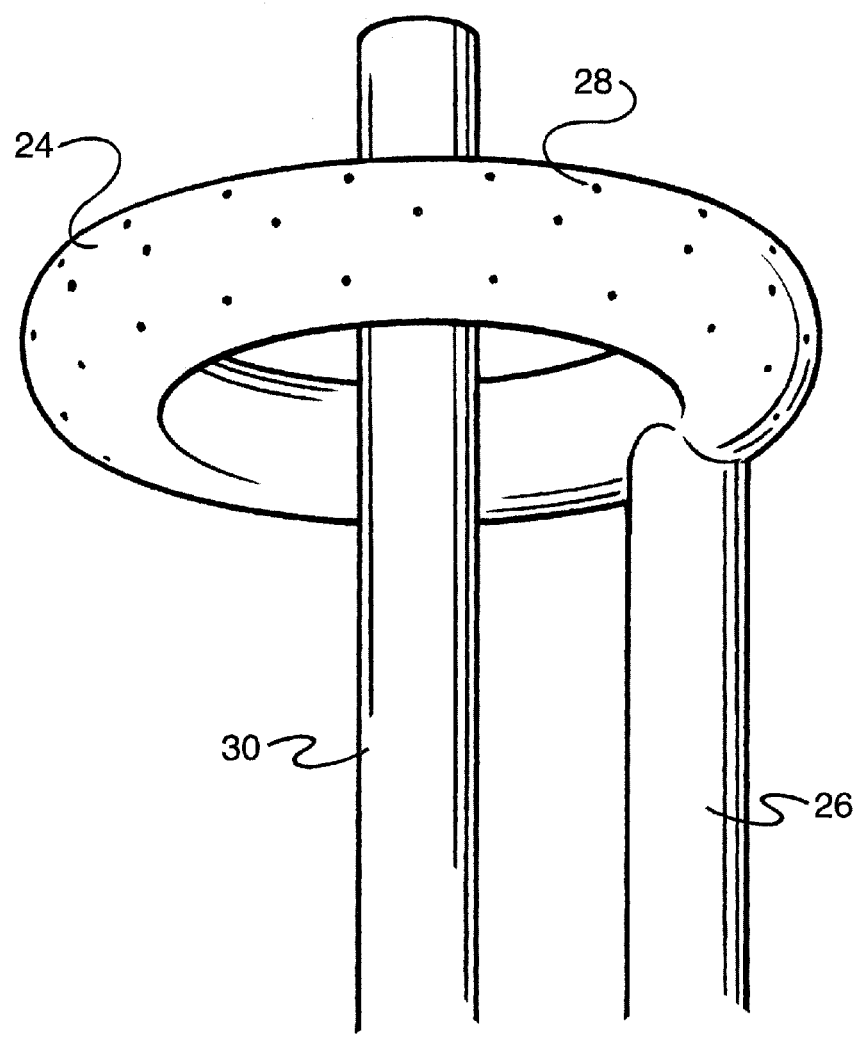
FIG. 5 is an enlarged view of the spraying nozzle and steam intake pipe shown in FIGS. 3 and 4.

As shown in FIGS. 3, 4 and 5, extending upwardly from the center of the tower 14 so as to be located within the receiver 12, is a spray nozzle 24. The spray nozzle 24 is supported by a feed tube 26 that feeds water to the nozzle 24. In the preferred embodiment of the invention, the spray nozzle 24 is toroidal in shape and has a plurality of small openings 28 therein through which water is sprayed toward the interior of the hollow receiver. The water will impinge on the interior surface of the receiver 12 and will be converted into steam. Preferably, the water will be directed toward only that portion of the interior of the receiver which is being directly heated by the heliostats 16.

The steam that is generated by the water impinging upon the interior of the receiver 12 can be drawn out of the receiver 12 through the pipe or conduit 30 which can be open at the top or can have openings in its wall. The conduit 30 runs downwardly through the tower 14 and can then be directed toward an electric turbine or any other equipment desired.

The present invention may be embodied in other specific forms without departing from the spirit or essential attributes thereof and accordingly, reference should be made to the appended claims rather than to the foregoing specification as indicating the scope of the invention.

I claim:

1. A solar power plant for generating steam comprising:
a receiver including a substantially hollow metal shell, the interior of which is sealed from the outside atmosphere;
a tower extending vertically upwardly from the ground and defining a vertical axis;
said receiver being mounted on said tower adjacent the top thereof;
a plurality of heliostats supported on the ground and surrounding said tower and said receiver, said heliostats directing rays from the sun onto said receiver for heating said receiver;
a spray nozzle within said hollow metal shell of said receiver;
means for supplying water from the exterior of said receiver to said nozzle, said nozzle being arranged to spray water onto the interior surface of said hollow metal shell whereby said water is turned into steam;
means for removing the steam generated within said receiver and directing said steam to an instrumentality for using said steam, and
means for rotating said receiver about said vertical axis at least approximately once per hour thereby regularly exposing a different portion of said receiver to said heliostats to prevent said receiver from melting.

2. The solar power plant for generating steam as claimed in claim 1 wherein said means for rotating includes a motor mounted outside of said receiver.

3. The solar power plant for generating steam as claimed in claim 2 wherein said motor is mounted on said tower.

4. The solar power plant for generating steam as claimed in claim 1 wherein said nozzle is toroidal in shape.

5. The solar power plant for generating steam as claimed in claim 1 wherein said receiver is substantially spherically shaped.

* * * * *